United States Patent [19]

Carroll

[11] 4,168,861
[45] Sep. 25, 1979

[54] DUMP-HOIST CONVERSION SYSTEM

[76] Inventor: Ollie J. Carroll, 7850 Peter Hoover Rd., New Albany, Ohio 43054

[21] Appl. No.: 875,210

[22] Filed: Feb. 6, 1978

[51] Int. Cl.$^2$ .............................................. B60P 1/20
[52] U.S. Cl. .................................. 298/22 J; 414/350
[58] Field of Search ............. 298/22 J, 22 R, 22 D, 298/22 P, 22 C, 17 R; 187/17; 91/447; 214/501

[56] References Cited

U.S. PATENT DOCUMENTS

| | | | |
|---|---|---|---|
| 2,849,255 | 8/1958 | Pasker | 298/22 J |
| 3,043,629 | 7/1962 | Schlueter et al. | 298/22 J |
| 3,438,308 | 4/1969 | Nutter | 91/447 |
| 3,617,090 | 11/1971 | Huffman et al. | 298/22 J |
| 3,871,706 | 3/1975 | Odom | 298/22 J |
| 4,019,781 | 4/1977 | Ray | 298/22 J |
| 4,023,650 | 5/1977 | Pleier | 187/17 |

FOREIGN PATENT DOCUMENTS 722518 11/1965 Canada .................. 298/22 J

Primary Examiner—Trygve M. Blix
Assistant Examiner—Ross Weaver
Attorney, Agent, or Firm—Millard, Cox & Smith

[57] ABSTRACT

A dump-hoist conversion system particularly suited for providing a dump capability in pick-up trucks. A modified scissors hoist is utilized having transversely spaced lower channel members as well as lift members. These components mutually nest when the bed of the truck is down and are located on either side of the differential gear housing in such down position. A dump pivot hinge is provided having a hinge axis lower than the upper surface of the side rails of the undercarriage frame. This provides a safety aspect against rear-end collisions. Hydraulic drive is provided through the utilization of a 12 volt d.c. motor which operates from the battery circuit of the vehicle.

6 Claims, 14 Drawing Figures

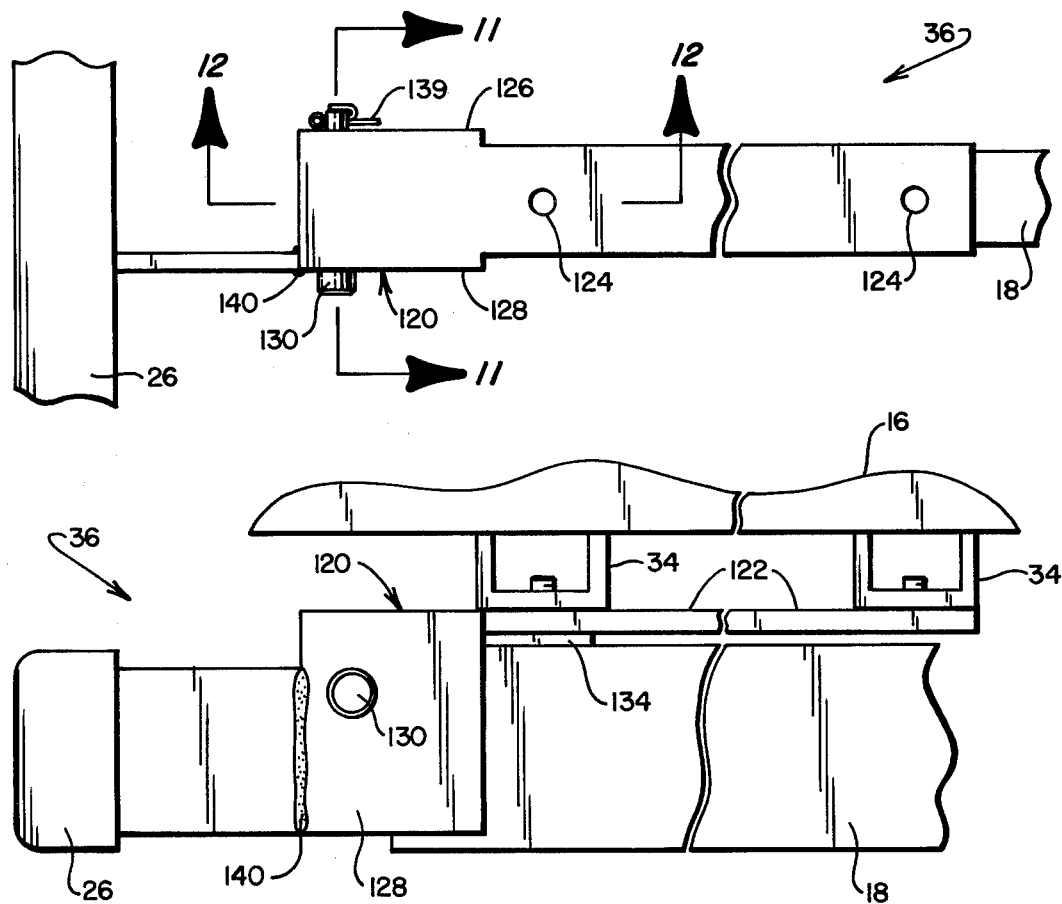
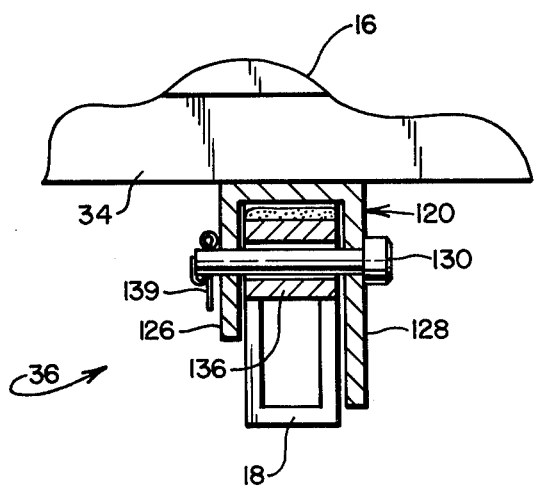

DUMP-HOIST CONVERSION SYSTEM

BACKGROUND

Entrepreneurs engaged in a variety of business endeavors have found considerable utility in the use of motor vehicles generally referred to as "pick-up" trucks. These trucks are relatively light as compared to typical heavy haulage vehicles, having capacities ranging from about ½ to ¾ ton. To enhance the appeal of the pick-up trucks, manufacturers have developed pleasing, streamlined body styles, for example, the lines of the bed portion of the trucks generally are integrated in flowing fashion with the lines and design of the cab and hood structure and ornamentation thereupon.

For many uses, the pick-up truck operators have developed a need for power dumping capability. However, while the beds of the trucks are readily removable by unbolting the floor thereof from the truck undercarriage, dump hoist installations heretofore have required the remounting of the dump bed at a higher level above the undercarriage in order to provide hoist access space. For example, the differential gear housing often is found to interfere with hoist installations. In addition to the readily apparent degredation to the design lines and aspects of the vehicle, such elevation of the bed derogates from vehicle stability under load. Vehicle safety further is compromised, inasmuch as the bed is only coupled to the truck body at rearward disposed hinges. In the event of a rearend accident or the like, the hinges tend to be torn from the body frame and the bed is thrust toward the cab. Degredation to body styling additionally is encountered in the repositioning of the rear bumper of the trucks following conversion. As is apparent, the dump bed cannot clear a bumper mounted to the termini of the frame side rail. Consequently, various schemes have been employed for remounting the bumper upon the frame at a lower level to provide dump clearance. Since bumpers are styled and contribute to the overall pleasing appearance of the trucks, this repositioning detracts from the looks of the converted truck.

Conversion heretofore carried out additionally have encountered problems relating to the structural integrity of the hoist equipment. In view of the relatively smaller size of the trucks, the hoist equipment itself remains small and the price of its installation must be low enough as to be commensurate with the lower cost of the trucks themselves. In consequence, the mere scaling down of conventional hoist structures to meet the needs of a smaller vehicle generally has been found to evolve structurally inadequate hoists. For example, extensive stressing has been determined to be present at the coupling between hydraulic motor piston rods and hoist components.

SUMMARY

The present invention is addressed to a dump-hoist conversion system for motor vehicles, particularly of the pick-up truck variety. A dump-hoist capability is provided with the invention without resort to elevating the truck bed to derive adequate space for the hoist assembly. Compactness of the hoist apparatus is, in part achieved through the use of an articulated design incorporated changing fulcra. As is known, such designs additionally serve to provide an increase in lifting speed in proportion to the decrease in power required to elevate the bed. Such actions additionally are highly efficient with respect to the pressure and volume of hydraulic fluid utilized.

Structural integrity of the hoist mechanism as well as compactness is achieved through the utilization of channel members for lifting components. These channel members are mutually transversely spaced such that the hoist mechanism "rides over" the differential gear housing of the truck when the bed is in its lowered position. Additionally, the articulated structure compactly fits beneath the side rails of the truck frame (sloped below horizontal) such that no elevation in bed height is required for its mounting. Structural integrity of the hoist is further enhanced through the utilization of a drive pivot pin which is positioned such that it extends through the downwardly depending flanges of the channel formed lifting members and specifically is welded at each flange component of the channels of the lifting member.

As another aspect and object, the system of the invention provides a dump pivot hinge arrangement wherein the hinge pins or hinge axes of the assembly are positioned below the upper level of the termini of the side rails of the truck. As a consequence, the hinge components will be driven into the ends of the side rails in the event of a rear end collison, thus contributing an important safety aspect to the conversion arrangement. Of further advantage, the hinges are so structured as to be capable of carrying the pick-up truck bumper at essentially the same elevation as their factory positioning on the truck so as not to derogate from the design lines of the vehicle while providing a full safety function. As another advantageous aspect, the invention provides for the mounting upon the frame of the truck of a small hydraulic fluid pump and d.c. 12 volt pump drive motor. As a consequence of this form of drive the system is easily coupled to the battery circuit of the truck and the dump capability remains functional even though the engine of the truck is not operating.

Other objects of the invention will, in part, be obvious and will, in part, appear hereinafter.

The invention, accordingly, comprises the system and apparatus possessing the construction, combination of elements and arrangement of parts which are exemplified by the following detailed disclosure.

For a fuller understanding of the nature and objects of the invention, reference should be had to the following detailed description taken in connection with the accompanying drawings.

BRIEF DESCRIPTION OF THE DRAWINGS

FIG. 9 is a partial top view of the pivot of the invention;

FIG. 10 is a partial side view of the dump pivot of the invention;

FIG. 11 is a partial sectional view taken through the plane 11—11 of FIG. 9;

DETAILED DESCRIPTION

Figure 1:
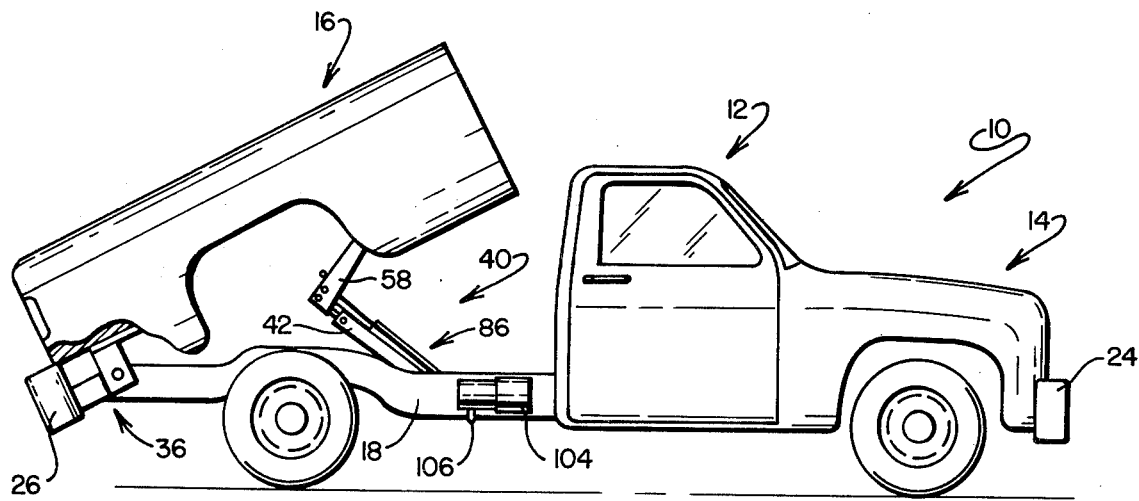
FIG. 1 is a side elevational view of a pick-up truck converted to have a dumping facility, portions of the figure being broken away to reveal internal hinge structure.
Figure 2:
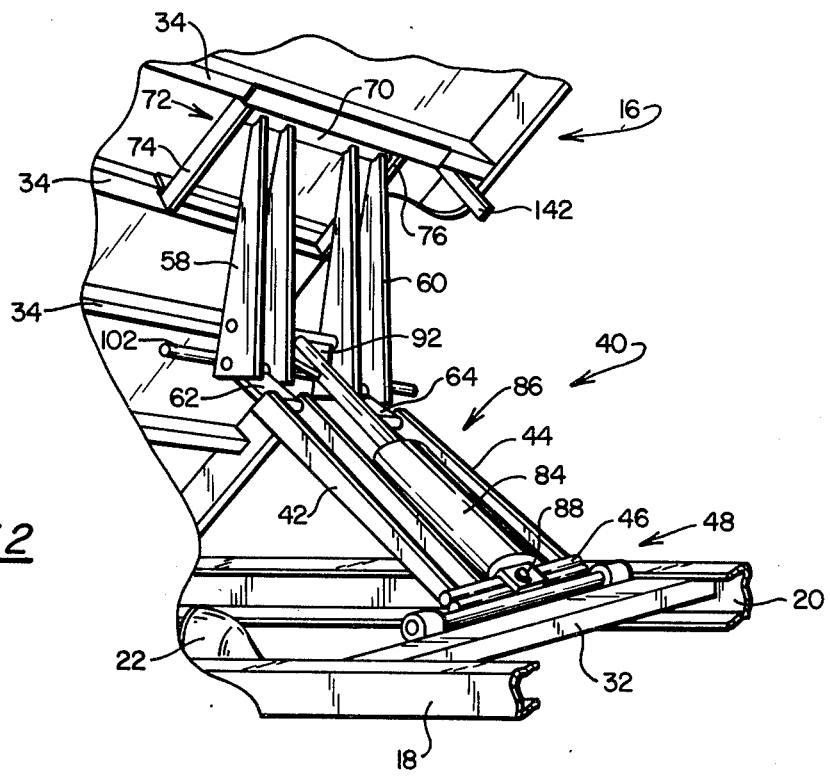
FIG. 2 is a detailed perspective view of a hoist embodying the present invention installed on a pick-up truck in showing the bed in an elevated orientation.
Figure 3:
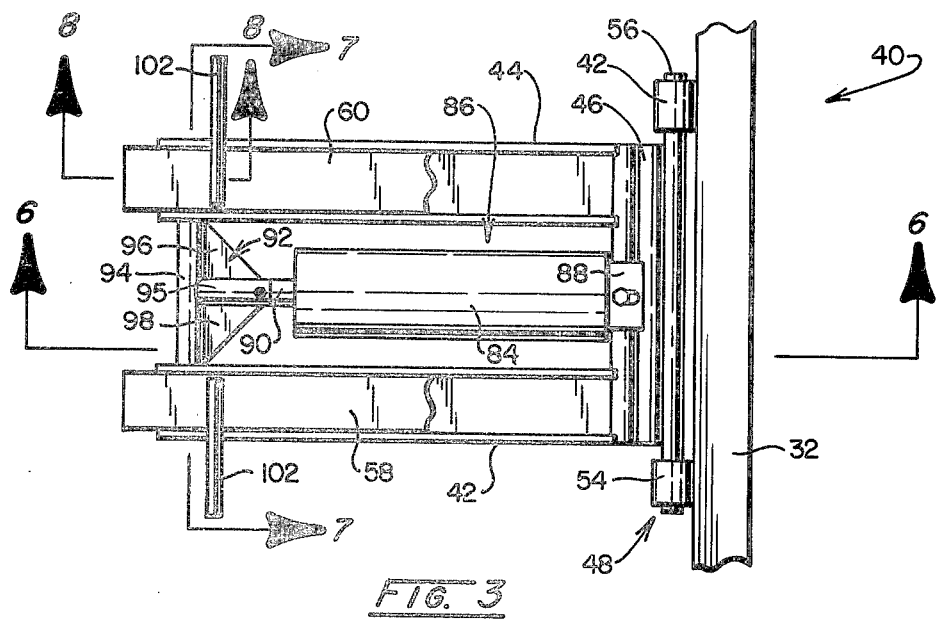
FIG. 3 is a partial top view of the hoist assembly shown in FIG. 1.

Referring to FIG. 1, a pick-up truck having been converted to incorporate a dumping capability is illustrated generally at 10. The truck 10 is of conventional design having a cab portion 12, a hood enclosed engine compartment at 14 and a bed 16. Looking additionally to FIG. 2, the frame or undercarriage of truck 10 includes side rails as at 18 and 20 to which the bed 16 normally would be bolted prior to hoist conversion. Also positioned intermediate side rails 18 and 20 in the vicinity of the rear wheels of the truck 10 is a differential gear housing, a portion of which is revealed in FIG. 2 at 22. Front and rear bumpers are located upon the truck respectively at 24 and 26. FIG. 2 additionally shows a transversely oriented frame cross-member 32 which is positioned rearwardly of cab 12. For most pick-up truck models, one such support as at 32 generally is positioned just rearwardly of cab 12, a location ideally suited for the installation of the dump-hoist system. FIG. 2 further reveals the presence of the subframe of bed 16. This subframe generally is formed of a series of transversely oriented beams as are represented at 34. As noted above, the entire assembly 16 conventionally is bolted to the frame side rails 18 and 20. For the instant conversion system, this connection is removed and a hinge assembly, represented in FIG. 1 generally at 36, is connected between the rearward termini of the side rails 18 and 20 and the rearward portion of the subframe of bed 16.

Figure 13:
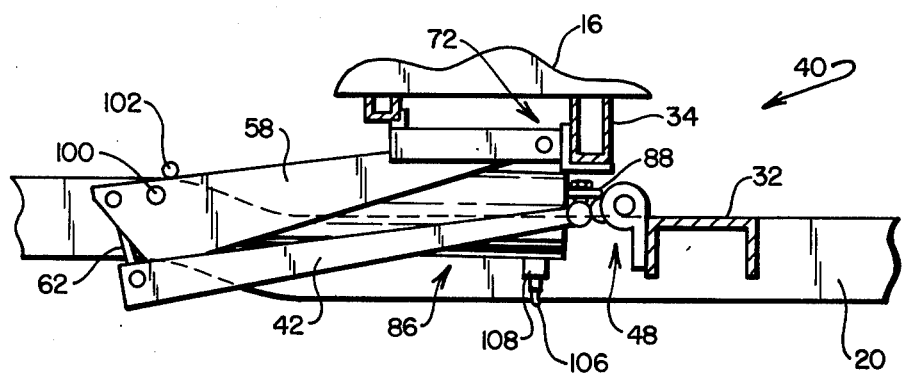
FIG. 13 is a partial side sectional and pictorial view of the hoist assembly of the invention in its substantially retracted orientation.

The hoist assembly of the conversion arrangement is revealed generally at 40. Formed as a modified scissors type device with a variable fulcra depending upon the degree of bed elevation, hoist 40 includes lower, transversely spaced apart and substantially parallel channel members 42 and 44, each of which is configured having upwardly disposed and spaced apart flanges. Members 42 and 44 are mutually connected at their forward ends to a stationary loading component shown generally at 46. In the discourse to follow, the terms "forward" and "rearward" are arbitrarily assigned for the purpose of defining the end of a member being discussed. It will be understood, however, that depending upon the orientation of the hoist, the actual sense of the designation may be reversed. Component 46 preferably is fashioned of at least two cold rolled steel rods which are welded together along their entire length and have a diameter of about 1 3/16ths inches. This structural rigidity is necessitated, inasmuch as component 46 must accommodate the principal stresses imposed by the hoist. Note in this regard, that component 46 serves to mutually space and support channel members 42 and 44 such that the rearwardly disposed portions thereof are positioned away from the differential gear housing 22 to the extent that when bed 16 is lowered, its subframe rests upon the upward surface of rails 18 and 20 and channel members 42 and 44 are positioned below the upward surface of the rails. In this regard, the channels 42 and 44 are positioned to slope downwardly below horizontal when bed 16 is down. This orientation is revealed in FIG. 13 and contributes to the advantageous positioning of bed 16 at the same elevational position it has prior to dump hoist conversion, i.e. resting upon side rails 18 and 20.

As is revealed more clearly in FIGS. 4–7, channel members 42 are pivotally attached to frame cross member 32 by a hinge assembly shown generally at 48. Assembly 48 includes two hinged brackets 52 and 54 which are welded to cross-member 32 and are configured to receive a hinge pin or shaft 56. Shaft 56, in turn, is welded to the outer steel bar of stationary loading component 46. It may be observed that the hinge assembly 48 is not subjected to the stress levels assumed by component 46. Accordingly, it may be formed of steel rod stock of lesser diameter than that forming the latter component. Of course, by virtue of its welded connection with loading component 46, the hinge contributes to the structural rigidity of the hoist at this pivot position. Where cross-member 32 is of relatively light or structurally weak design, it is advisable to buttress it by welding additional steel between the member and side rails 18 and 20. The rearward ends of lower channel members 42 and 44 are pivotally coupled with corresponding lift members shown respectively at 58 and 60. Members 58 and 60 are formed as channels having downwardly disposed spaced flanges. As revealed in FIGS. 7, 8 and 13, this spacing of the downwardly disposed flanges of members 58 and 60 is such as to permit the nesting thereof within the corresponding upwardly disposed flanges of channel members 42 and 44 when bed 16 is in its lowered position. As indicated above, this structuring enhances the necessary compactness of the entire hoist assembly 40.

Figure 8:
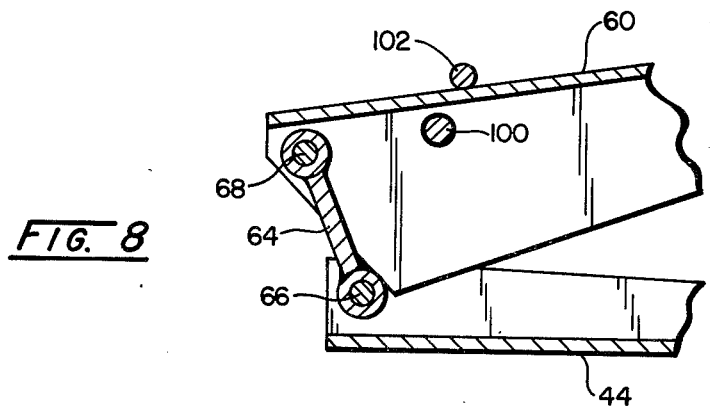
FIG. 8 is a partial sectional view taken through the plane 8—8 of FIG. 3.

As is revealed in detail in FIG. 8, the pivotal coupling between lower channel members 42 and 44 and lift members 58 and 60 is provided by respective link members 62 and 64. In this regard, each of the links 62 and 64 is formed having oppositely disposed tubular hinge components or transverse sleeves through which extend pivot shafts. These pivot shafts extend through and are weldably connected to the flanges of lower channel members 42 and 44 and corresponding lift members 58 and 60. FIG. 8 reveals a typical connection wherein pivot shafts 66 and 68 extend through the flanges of respective members 44 and 60. Conventional grease fittings for introducing lubricant to the pivotal connections (not shown) may be mounted upon the tubular hinge portions of each of the link members.

The forward ends of lift members 58 and 60 are welded to the hinge tube 70 of a pivot assembly 72. Assembly 72 includes a rectangular bracket formed of bar stock including side bars 74 and 76 having a length corresponding with the longitudinal spacing of bed subframe beams 34. Bars 74 and 76 are welded, in turn, to the transversely oriented angle stock components 78 and 80 as revealed in FIG. 4. These components fit over and are welded to the beams as at 34. A pivot shaft 82 extends through side bars 74 and 76 and is journaled within hinge tube 70. As before, a grease fitting may be provided within hinge tube 70 for purposes of inserting lubricant. Preferably, shaft 82 is weldably connected to side bars 74 and 76.

Referring to FIGS. 2–7, a hydraulic motor 86 is shown mounted between lower channel members 42 and 44. Being of conventional design, the motor 86 includes a cylinder 84, one end of which is pivotally attached as by bolt and bracket 88 to stationary loading component 46. The outward end of piston 90 of the cylinder 86 is connected by bolts to a yoke assembly 92 which includes a transversely oriented hinge tube 94. Tube 94 is welded to a tube collar 95 which, in turn, is bolted to rod 90. Triangular gussets 96 and 98 are welded to collar 95 and tube 94. As is revealed in FIG. 6, a drive pivot pin 100 extends through hinge tube 94 and is welded as it extends through bores formed within the flange components of lift members 58 and 60. Pivot pin 100 is welded to each of the two flanges of each member 58 and 60 at the internal surfaces of the flanges and, additionally, at the outer surfaces as it extends through the outer-most ones of the flanges. A grease fitting may be positioned within hinge tube 94 to provide for lubrication of the yoke pivot. The particular welded connection provided in conjunction with tube 94 and drive pivot pin 100 is of critical importance to the hoist assembly. If the welds are not provided as described, the hoist will be prone to failure at the hinge tube 94 drive pivot pin 100 interconnection.

Figure 4:
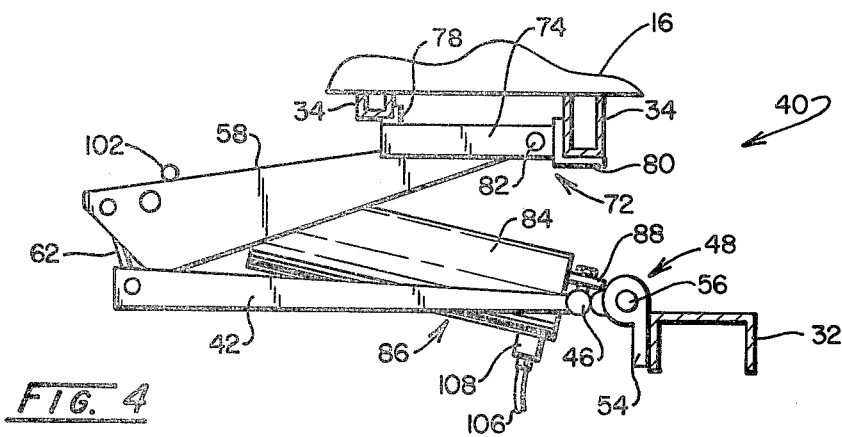
FIG. 4 is a partial side view of the hoist assembly of the invention.
Figure 5:
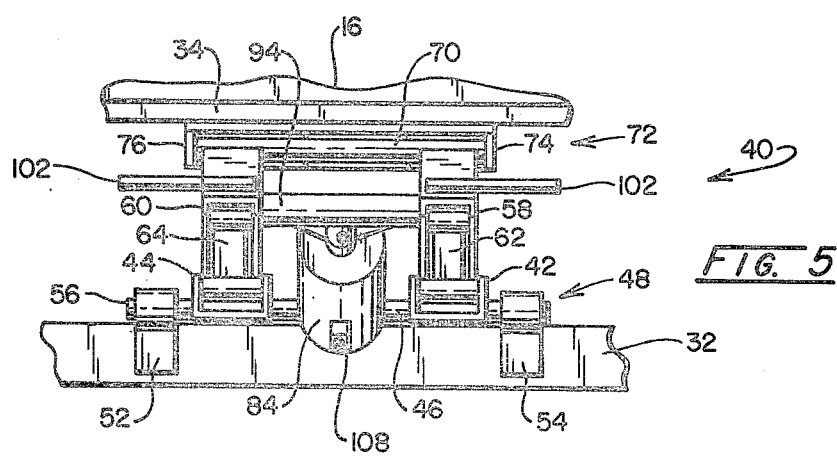
FIG. 5 is a partial rear view of the hoist assembly of the invention.
Figure 6:
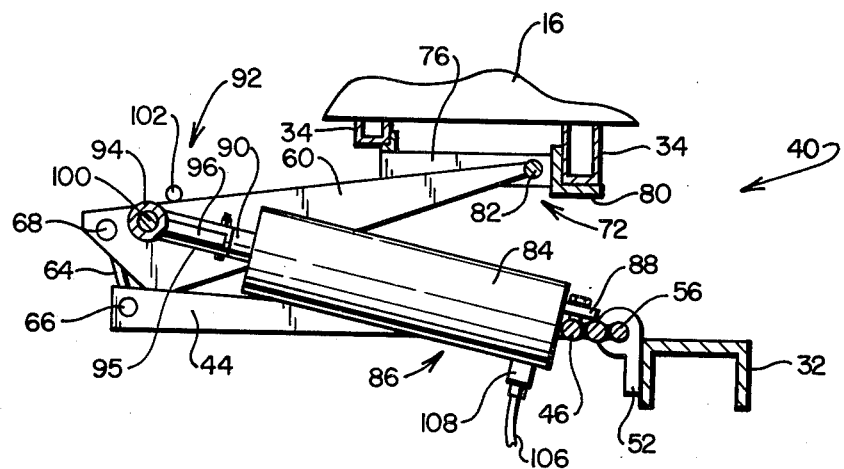
FIG. 6 is a partial sectional view taken through the plane 6—6 of FIG. 3.
Figure 7:
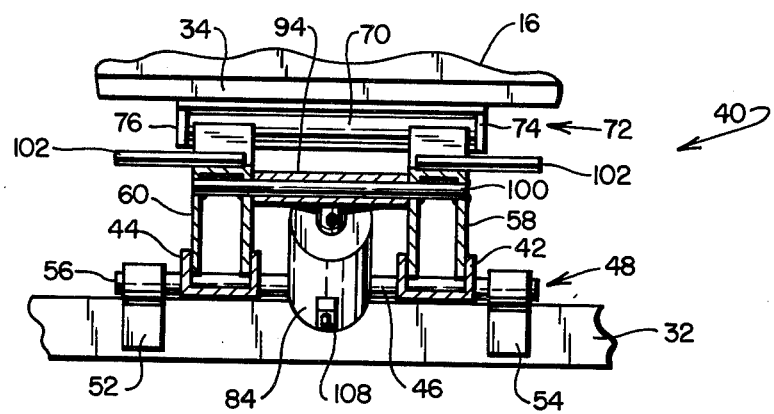
FIG. 7 is a partial sectional view taken through the plane 7—7 of FIG. 3.

As is apparent, with the arrangement shown, as piston 90 is extended, lift members 58 and 60 commence pivoting as shown in FIG. 4 and the hoist assembly eventually reaches the orientation shown in FIG. 2. By virtue of the presence of links 62 and 64, the fulcrum of the mechansim varies during the hoisting process. This arrangement permits the entire assembly to remain in an inactive status in the orientation shown in FIG. 13. Note that lower channel members 42 and 44 in this orientation slope downwardly from a horizontal plane extending from the pivot at hinge pin 56. This arrangement permits the hoist to be mounted in a manner wherein the bed 16 remains in its original design orientation resting upon side rails 18 and 20. To retain the hoist assembly 40 in its proper inactive orientation, a stop bar 102 is welded to the upper surface of lift members 58 and 60. This bar rests against the side rails 18 and 20 when the hoist is in a non-dumping posture.

Looking to FIG. 1, a small d.c. (12 volt) motor and coupled hydraulic pump 104 is shown attached to side rail 18. Hydraulic conduiting 106 extends from the pump-motor assembly to the input side of cyclinder 84. At that input, a flow restrictor 108 (FIG. 13) is provided which, while permitting full flow into the cylinder during the operation of motor-pump 104, restricts the flow to ½ the normal rate for reversal when the bed 16 is lowered. This provides a safety feature which restricts the rate of return or downward movement of bed 16, for example, in the event of a failure of conduit 106. A fluid flow restrictor valve suited for the instant purpose is marketed by Fluid Controls, Inc., Mentor, Ohio, model 2RN11-2-15/2000 psi. The use of a d.c. motor-pump assembly 104 is convenient for the purposes of converting pick-up trucks to have a dumping capability. In this regard, only simple connections need be made to the battery power supply of the vehicle. Operationally, a simple switch (not shown) mounted on the assembly 104 can operate the dump and there is no need for the motor of vehicle 10 to be operating in order for the dumping operation to be carried out. A combined motor-hydraulic pump assembly 104 may be provided, for example as the "Hydraulic Power Unit-d.c. electrical" marketed by Stone Hydraulic Industries, Rockford, Ill.

Referring in FIGS. 1 and 9–12, the rear hinge assembly 36 is revealed in detail. Assembly 36 includes two hinge components which are mounted upon the ends or termini of side rails 18 and 20. Inasmuch as the components are identically structured, only that hinge arrangement connected to side rail 18 is shown in the drawings. The pivoting portion of each hinge assembly is shown at 120 to comprise a somewhat elongate top plate 122 having two downwardly depending flange members 126 and 128. Bores 124 extending through plate 122 are so spaced as to permit the plate to be bolted to the centers of beams 34 of the subframe of bed 16. Flange members 126 and 128 are so spaced as to nestably ride over the outward surfaces of box-like side rail 18, as revealed more clearly in FIG. 11. Additionally, flanges 126 and 128 are provided aligned bores for receiving a hinge pin 130.

Figure 12:
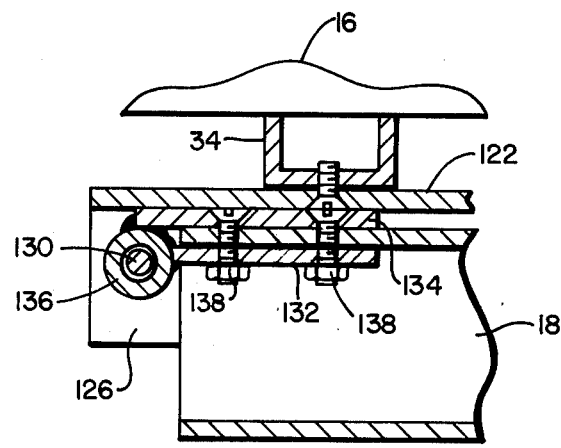
FIG. 12 is a partial sectional view taken through the plane 12—12 of FIG. 9.

As is revealed in FIGS. 11 and 12, the stationary component 132 of the hinge assembly is joined to a flat plate 134 by a hinge tube 136 having a diameter suited for receiving hinge pin 130 as it extends through flanges 126 and 128. The flat plate portion 134 is connected to the upper surface of side rail 18 by machine screws and nuts as revealed at 138, and pin 130 is retained within tube 136 by a cotter pin 139. Of particular importance to the arrangement shown, it may be noted that the pivot axis of each hinge assembly lies below the upwardly disposed surface of the side rail to which it is attached. As a consequence, any rear-end impact upon truck 10 will tend to cause the hinge to be driven into the terminus or end face of the side rail, thus absorbing the impact into the undercarriage as opposed to causing the bed to assorb the shock separately from the frame.

As another advantage of the hinge arrangement, it may be noted that one flange, for example flange 128 is of longer extent than the other. With this structure, the bumper 26 may be welded to the hinge as shown at 140 at substantially the same elevation at which it is mounted prior to conversion. Thus the pleasing design lines of the pick-up truck are maintained. Note that the bumper 26, when struck will assert the thrust of such impact into the termini or end faces of side rails 18 and 20.

While proper alignment of bed 16 both during its elevation and normal use in its lowered position is provided through the structure of the hinge arrangement 36 as well as through the relatively spaced structure of the components of hoist 40, additional guides, as shown at 142 in FIG. 2, may be utilized for stability against transverse movement about side rails 18 and 20.

From the foregoing it may be observed that a dump-hoist conversion system is provided which displays the advantageous attributes of being so designed as to be capable of operation without necessitating a higher mounting of bed 16. Additionally, the specific design illustrated and described provides for high structural reliability in combination with necessary compactness. Of particular interest, the ornamental design attributes originating in the pick-up truck itself are maintained both with respect to the elevation of bed 16 and the elevation of bumper 26. Further, structural safeguards against rear-end collisions and the like are maintained with the unique structuring of hinge assembly 36. As a further advantageous aspect, the hoist operates from the 12 volt battery supply of the pick-up truck and incorporates a safety feature wherein in the event of the rupture of a hydraulic fluid line during elevation of bed 16, a flow restriction is automatically asserted to slow the descent of bed 16 to its lower position.

Figure 14:
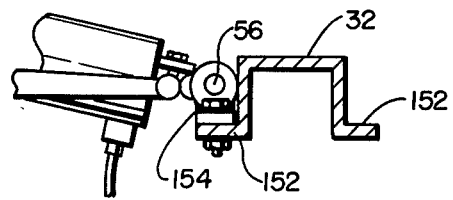
FIG. 14 is a partial side and sectional view of an alternate preferred embodiment for one pivot mounting of the assembly of the invention.

FIG. 14 shows a preferred hinge assembly which may be utilized in place of earlier described assembly 48. This assembly is suited for utilization of a frame cross-member 32 having a configuration incorporating two outwardly depending flanges as at 152. Two hinged brackets 154 are provided in the same fashion as described earlier at 52 and 54 which are configured to receive hinge pin or shaft 56. However, the brackets are configured as shown to retain shaft 56 at a level lower than the upper surface of frame member 32. This is provided through the use of transversely extending plates joined with the tube portion of the brackets and bolted to flanges 152.

Since certain changes may be made in the above system and apparatus without parting from the scope of the invention herein involved, it is intended that all matter contained in the above description or shown in the accompanying drawings shall be interpreted as illustrative and not in a limiting sense.

What is claimed:

1. A dump hoist conversion system for motor vehicles having a bed supported over a differential gear housing and upon substantially parallel side rails extending rearwardly from a front portion of said vehicle to termini and a frame cross-member connected between said side rails comprising:
    first hinge means for pivotally connecting said bed to said side rails in the vicinity of said termini;
    a hoist mountable beneath the underside of said bed comprising:
    first and second transversely spaced-apart substantially parallel lower channel members each having spaced, parallel flange components extending between the forward and rearward ends thereof and each having a first transverse pivot shaft extending between said flange components in the vicinity of the rearward ends thereof, said first and second lower channel members being transversely spaced apart a distance adequate to permit the movement of each to a location beside said differential gear housing;
    a loading component rigidly connected to and extending transversely between the forward ends of said first and second channel members;
    second hinge means for pivotally coupling the loading component to said frame cross-member;
    first and second lift members each formed as a channel having spaced parallel flange components extending between the forward and rearward ends thereof and each having a second transverse pivot shaft extending between said flange components in the vicinity of said rearward ends thereof;
    third hinge means for pivotally coupling the forward ends of said first and second lift members to the underside of said bed;
    first and second link members pivotally connected between said first and second pivot shafts;
    a drive pivot pin extending transversely between said first and second lift members, spaced from the forward ends thereof and weldably connected to each of said flange components thereof;
    hydraulic motor means having a piston rod and a cylinder, said cylinder being connected with said loading component;
    a yoke assembly fixed to said piston rod and including a hinge tube journaled over and pivotal about said drive pivot pin;
    stop bar means extending transversely over and fixed to the upwardly disposed surfaces of said first and second lift members and extending outwardly therefrom a length sufficient to contact the upwardly disposed surfaces of said side rails;
    valve means for restricting the flow of hydraulic fluid outwardly from said hydraulic motor means cylinder while permitting the unrestricted flow of said fluid thereinto, the magnitude of the restriction being such that about twice the volume flow into the cylinder will flow out of the cylinder in the same period of time;
    a d.c. electric motor energizable to provide a rotative output and mountable upon said side rail;
    means for supplying electrical current from the battery circuit of said vehicle to said electric motor;
    a hydraulic pump, mountable upon said side rail adjacent said electric motor and drivable from the said rotative output thereof; and
    hydraulic fluid conduiting connectible between said pump and said valve means.

2. The dump hoist conversion system of claim 1 in which:
    the said flange components of said first and second lower channel members extend upwardly; and
    the said flange components of said first and second lift members extend downwardly and are mutually spaced a distance permitting their movement into a nesting orientation within the said flange components of respective said first and second lower channel members.

3. The dump hoist conversion system of claim 1 in which said first hinge means comprises two hinge assemblies each connected between a said side rail and said bed and having a pivot axis situate adjacent said terminii of an associated said side rail and at a level lower than the upper surface thereof.

4. The dump hoist conversion system of claim 3 wherein each said hinge assembly includes:
    a stationary component connectable to the rearwardly disposed portion of a said side rail and having means defining a hinge tube through which said pivot axis extends across the terminus of said side rail below the upwardly disposed surface thereof;
    a pivoting portion connectable to said bed and pivotally connectable with said means defining a hinge tube; and
    a hinge pin means insertable within said means defining a hinge tube for pivotally connecting said stationary component and said pivoting portion.

5. The dump hoist conversion system of claim 4 in which each said pivoting portion is configured having a downwardly extending flange connectable with the rear bumper of said vehicle.

6. The dump hoist conversion system of claim 1 in which said first and second link members each comprise spaced parallel hinge tubes weldably connected to the oppositely disposed edges of an intermediately disposed plate component.

* * * * *